US010082239B2

(12) United States Patent
 Caswell

(10) Patent No.: US 10,082,239 B2
(45) Date of Patent: *Sep. 25, 2018

(54) TEMPORARY SUPPORT

(71) Applicant: Indian Industries, Inc., Evansville, IN (US)

(72) Inventor: Tommy Caswell, Surry (GB)

(73) Assignee: Indian Industries, Inc., Evansvill, IN (US)

( * ) Notice: Subject to any disclaimer, the term of this patent is extended or adjusted under 35 U.S.C. 154(b) by 430 days.

This patent is subject to a terminal disclaimer.

(21) Appl. No.: 14/711,110

(22) Filed: May 13, 2015

(65) Prior Publication Data

US 2015/0247603 A1 Sep. 3, 2015
US 2017/0167656 A9 Jun. 15, 2017

Related U.S. Application Data

(63) Continuation of application No. 13/852,629, filed on Mar. 28, 2013, now Pat. No. 9,050,513, which is a (Continued)

(30) Foreign Application Priority Data

Jan. 16, 2008 (GB) .................................. 0800703.1
Oct. 28, 2008 (GB) .................................. 0819761.8

(51) Int. Cl.
*F16M 11/40* (2006.01)
*F16M 11/24* (2006.01)
(Continued)

(52) U.S. Cl.
CPC ............. *F16M 11/40* (2013.01); *A63B 63/00* (2013.01); *B32B 1/08* (2013.01); *F16M 11/10* (2013.01);
(Continued)

(58) Field of Classification Search
CPC ....... A63B 63/00; A63B 61/00; A63B 225/62; A63B 71/023; A63B 2210/50;
(Continued)

(56) References Cited

U.S. PATENT DOCUMENTS 2,459,198 A 1/1949 St. John
2,765,014 A 10/1956 Muller
(Continued)

FOREIGN PATENT DOCUMENTS

BE 1017450 10/2008
DE 4025722 8/1992
(Continued)

OTHER PUBLICATIONS

Abbreviated Examination Report for GB0819761.8, dated May 9, 2012, 1 pg.
(Continued)

*Primary Examiner* — Tan Le

(57) ABSTRACT

Equipment is temporarily supported above the ground by a self-supporting, readily erectable and transportable mast. The mast comprises a pneumatically inflatable elongate tube having a first end to which the equipment is coupled and a second end coupled to a ground support tripod. The mast is provided with bracing structure adapted to brace the tube when inflated and including respective flexible members extending from each tripod leg to the first end of the tube.

20 Claims, 16 Drawing Sheets

Related U.S. Application Data continuation of application No. 12/812,946, filed as application No. PCT/GB2009/000112 on Jan. 16, 2009, now Pat. No. 8,684,327.

(51) Int. Cl.

| | | |
|---|---|---|
| *F21V 21/32* | (2006.01) | |
| *F21V 21/30* | (2006.01) | |
| *F21V 21/14* | (2006.01) | |
| *E04H 15/20* | (2006.01) | |
| *A63B 63/00* | (2006.01) | |
| *F16M 11/32* | (2006.01) | |
| *F21S 8/08* | (2006.01) | |
| *F21V 21/06* | (2006.01) | |
| *B32B 1/08* | (2006.01) | |
| *F16M 11/10* | (2006.01) | |
| *F16M 11/14* | (2006.01) | |
| *F16M 11/34* | (2006.01) | |
| *F16M 11/42* | (2006.01) | |
| *A63B 71/02* | (2006.01) | |
| *F21V 17/00* | (2006.01) | |

(52) U.S. Cl.
CPC ............ *F16M 11/14* (2013.01); *F16M 11/24* (2013.01); *F16M 11/32* (2013.01); *F16M 11/34* (2013.01); *F16M 11/42* (2013.01); *F21S 8/08* (2013.01); *F21V 21/06* (2013.01); *F21V 21/145* (2013.01); *F21V 21/32* (2013.01); *A63B 71/023* (2013.01); *A63B 2210/50* (2013.01); *A63B 2243/0037* (2013.01); *E04H 15/20* (2013.01); *F16M 2200/065* (2013.01); *F21V 17/007* (2013.01); *F21V 21/30* (2013.01); *Y10T 428/1334* (2015.01)

(58) Field of Classification Search
CPC . A63B 2243/0037; E04H 15/20; E04H 12/02; E04H 2015/201; Y10T 428/1334; F16M 11/00; F16M 11/40; F16M 11/24; F16M 11/32; F16M 11/34; F16M 11/42; F16M 2200/065; E04C 3/36; F21V 21/06; F21V 21/145; F21V 21/32; F21V 21/30
USPC .......... 248/49, 75, 157, 160, 168, 519, 529; 52/2.11, 2.21, 2.13, 2.22; 473/197, 476; 343/880, 895, 897, 898
See application file for complete search history.

(56) References Cited

U.S. PATENT DOCUMENTS

| | | | |
|---|---|---|---|
| 2,832,555 | A | 4/1958 | Terhune |
| 3,110,368 | A | 11/1963 | Ross |
| 3,137,307 | A | 6/1964 | Scurlock |
| 3,156,471 | A | 11/1964 | Bibeau |
| 3,277,479 | A | 10/1966 | Struble, Jr. |
| 3,278,938 | A | 10/1966 | Rosenthal |
| 3,364,488 | A | 1/1968 | Perenic et al. |
| 3,484,788 | A | 12/1969 | Bell et al. |
| 3,608,250 | A | 9/1971 | Ducrocq |
| 3,871,607 | A | 3/1975 | Pile |
| 3,945,867 | A | 3/1976 | Heller, Jr. et al. |
| 3,951,086 | A | 4/1976 | Lown et al. |
| 4,146,897 | A | 3/1979 | Wilson et al. |
| 4,240,603 | A | 12/1980 | Chiariello |
| 4,302,266 | A | 11/1981 | Kutnyak |
| 4,514,447 | A | 4/1985 | Boxmeyer |
| 4,662,130 | A | 5/1987 | Muira et al. |
| 4,751,869 | A | 6/1988 | Paynter |
| 4,762,298 | A | 8/1988 | Wood |
| 4,876,829 | A | 10/1989 | Mattick |
| 5,205,086 | A | 4/1993 | Heim |
| 5,269,623 | A | 12/1993 | Schloemer |
| 5,308,029 | A | 5/1994 | Bingham |
| 5,421,128 | A | 6/1995 | Sharpless et al. |
| 5,531,419 | A | 7/1996 | Gustafsson et al. |
| 5,546,707 | A | 8/1996 | Caruso |
| 5,677,023 | A | 10/1997 | Brown |
| 5,702,109 | A | 12/1997 | Mahin |
| 5,702,373 | A | 12/1997 | Samson |
| 5,735,083 | A | 4/1998 | Brown |
| 5,743,049 | A | 4/1998 | Thallemer |
| 5,832,688 | A | 11/1998 | Crissey et al. |
| 5,865,693 | A | 2/1999 | Johnson |
| 6,165,163 | A | 12/2000 | Chien et al. |
| 6,179,367 | B1 | 1/2001 | Bowen |
| 6,322,230 | B1 | 11/2001 | Medici |
| 6,543,730 | B2 | 4/2003 | Pedretti |
| 6,629,899 | B2 | 10/2003 | Chauvet et al. |
| 7,011,280 | B2 | 3/2006 | Murray et al. |
| 7,052,417 | B2 | 5/2006 | Chen |
| 7,062,883 | B1 | 6/2006 | Langholz et al. |
| 7,108,716 | B2 | 9/2006 | Burnside et al. |
| 7,118,487 | B2 | 10/2006 | Turcot |
| 7,811,495 | B2 | 10/2010 | Dagher et al. |
| 8,141,301 | B2 | 3/2012 | Brown |
| 8,684,327 | B2 * | 4/2014 | Caswell ................ F16M 11/24 248/168 |
| 9,050,513 | B2 * | 6/2015 | Caswell ................ F16M 11/24 |
| 2004/0127309 | A1 | 7/2004 | Huang |
| 2005/0121590 | A1 | 6/2005 | Vanover |
| 2007/0251185 | A1 | 11/2007 | Haggard |
| 2008/0106888 | A1 | 5/2008 | Nalitchaev et al. |
| 2009/0195475 | A1 | 8/2009 | Ashjaee et al. |

FOREIGN PATENT DOCUMENTS

| | | |
|---|---|---|
| DE | 29502733 | 4/1995 |
| DE | 102004002764 | 6/2004 |
| EP | 0264973 | 4/1988 |
| EP | 0270367 | 6/1988 |
| EP | 1528311 | 5/2005 |
| FR | 1382305 | 12/1964 |
| FR | 2887523 | 12/2006 |
| GB | 2422322 | 7/2006 |
| GB | 2456424 | 7/2009 |
| JP | 3022902 U | 4/1996 |
| JP | H10-504362 | 4/1998 |
| JP | 2003-151309 | 5/2003 |
| JP | 2005-140327 | 6/2005 |
| WO | WO 93/21389 | 10/1993 |
| WO | WO 1993/021389 | 10/1993 |
| WO | WO 98/30291 | 7/1998 |
| WO | WO 99/47853 | 9/1999 |
| WO | WO 02/063207 | 8/2002 |
| WO | WO 09/090393 | 7/2009 |

OTHER PUBLICATIONS

AU Patent Exam Report for appln No. 2009204742, dated Jan. 25, 2014; pp. 4.
Examination Opinion for GB0819761.8, dated Feb. 17, 2010, 1 pg.
Examination Report for EP09702812.0, dated Jul. 17, 2013, 10 pgs.
Examination Report for EP13166151.4, dated Jul. 18, 2013, 13 pgs.
Examination Report for GB0819761.8, dated Jan. 7, 2013, 2 pgs (also included as attachment to PPH request).
Examination Report for GB0819761.8, dated Sep. 21, 2012, 3 pgs (also included as attachment to PPH request).
International Preliminary Report on Patentability and Written Opinion of the International Searching Authority dated Jul. 20, 2010, issued in International Patent Application PCT/GB2009/000112, filed Jan. 16, 2009, 7 pages.
International Search Report dated Feb. 3, 2010, issued in International Application PCT/GB2009/002546, filed Oct. 26, 2009, 4 pages.
International Search Report dated Oct. 29, 2009, issued in International Application PCT/GB2009/000112, filed Jan. 16, 2009, 3 pages.

(56) References Cited

OTHER PUBLICATIONS

Notice of Reasons for Rejection of JP2010-542679, dated Feb. 5, 2013, 4 pgs.
UK Search Report dated Feb. 16, 2010, issued in priority UK Application GB0819761.8, filed Jan. 6, 2008, 1 page.
UK Search Report dated May 7, 2009, issued in related UK Application GB0900770.9, filed Jan. 16, 2009, 1 page.

* cited by examiner

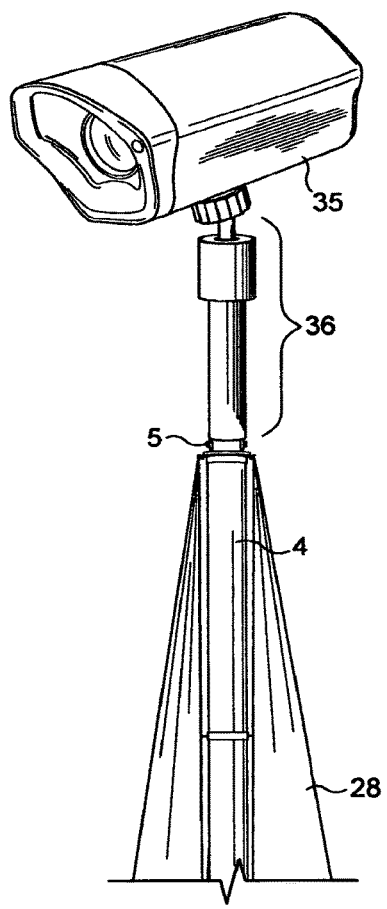
FIG. 14
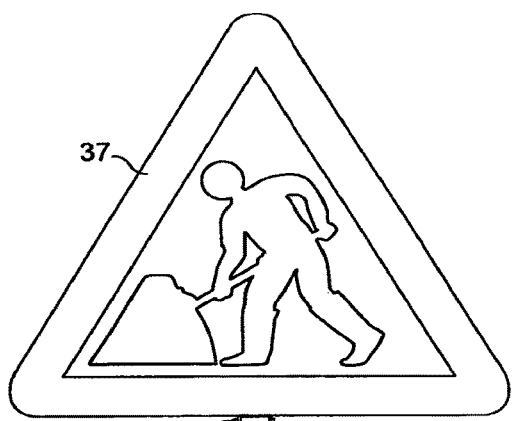
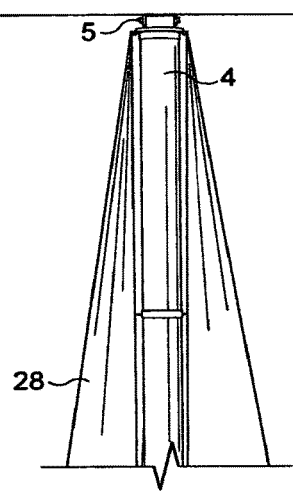
FIG. 15

TEMPORARY SUPPORT

CROSS-REFERENCE TO RELATED APPLICATIONS

This application is a continuation of application Ser. No. 13/852,629, filed Mar. 28, 2013, which is a continuation of application Ser. No. 12/812,946, filed Sep. 16, 2010, which is a national stage of PCT/GB2009/000112, filed Jan. 16, 2009, which claims foreign priority to Appl. No. GB 0819761.8, filed Oct. 28, 2008, and Appl No. GB 0800703.1, filed Jan. 16, 2008, all of which are hereby incorporated by reference in their entireties.

BACKGROUND

This disclosure relates to the temporary support of signs and of other equipment, such as electrical equipment, especially floodlights, above the ground.

There are numerous circumstances where signs or other equipment, especially electrical equipment of different kinds, needs temporarily to be mounted on a support above the ground. Examples include temporary traffic signs or signals, public address speakers at a country show or for a travelling circus, satellite dishes for military communication, emergency lighting for roadworks, and temporary floodlights for emergency workers at the site of an accident or for sporting fixtures played after dark or in poor lighting conditions, especially on public grounds.

While there have been numerous prior proposals for temporary supports for signs and for electrical and other equipment, mostly in the form of mechanically connectable structures, the structures proposed have often suffered from being too complicated to be readily erectable and demountable by a single person unfamiliar with the structure, too bulky when collapsed to be readily transportable, for example in the boot (trunk) of a small car (automobile), or insufficiently stable.

As will become clear from the detailed description below, the present disclosure adopts a different approach.

SUMMARY OF THE INVENTION

In accordance with a first aspect of this disclosure, equipment is adapted to be temporarily supported above the ground by a self-supporting, readily erectable and transportable mast, the mast comprising: a pneumatically inflatable elongate tube having a first end to which the equipment is coupled and a second end coupled to a ground support tripod, and being provided with bracing structure adapted to brace the tube when inflated and including respective flexible members extending from each tripod leg to the first end of the tube.

Preferably the tripod legs are extendable, preferably being telescopic, and are interconnected by bracing struts that may be pushed beyond dead centre to resist unintentional collapse.

It will readily be appreciated that a bracing structure formed of flexible members is non-rigid, and so allows the structure as a whole to be packed away for easy transport when not inflated. The principal rigid components of the structure will be the tripod, which, as noted above preferably has telescopic legs to reduce its packing space requirement, and the equipment to be supported. As will become clear from the detailed description below with reference to the accompanying drawings, this enables (say) a temporary floodlight to be transportable in a conventional shoulder bag for erection where required simply by opening the tripod and inflating the tube.

The flexible members may each comprise a single or multiple ply cord interconnecting each leg, preferably from a mounting point intermediate its ends when extended, to the first end of the tube, preferably with additional connections to one or more collars mounted on the tube at positions intermediate its ends. The additional connections may comprise respective cords extending from the collar to each said flexible elongate member. Alternatively, each such collar may be provided with three spokes, the proximal ends of which are coupled to the collar, and the distal ends of which are coupled to the cord. For each collar, the distal ends of its spokes are preferably connected by three further cords.

When the tube is inflated for use, the cords are each placed under tension, thereby bracing the structure as a whole.

In an alternative arrangement, each flexible member may comprise a respective web of material interconnecting a mounting point intermediate the ends of a leg when extended with the first end and the second end of the tube.

When the tube is inflated for use and the tripod positioned on the ground, each said web is placed under tension between the first end and the mounting point and between the first and second ends, thereby bracing the structure as a whole.

Preferably the tube is flexible when deflated and substantially inflexible when inflated, and includes reinforcing textile strands helically laid between two layers formed from a material selected from rubber, substitutes therefor and plastics, the strands being laid at an angle to the axis of the tubular member of 45°, and more preferably, 30° or less.

Preferred embodiments have one or more of the following features: The said material is PVC. The reinforcing strands are formed of a textile material, preferably nylon. The reinforcing strands are helically wound in opposing senses about the axis of the tubular member so as to cross. The reinforcing strands are laid at an angle of between 10 and 15°. The strands with opposing sense may be interwoven, thereby resulting in a woven textile reinforcing structure. There is a second layer of reinforcing strands laid at a different angle to the first. The first layer of reinforcing strands are laid at an angle of between 10 and 15° and the second layer of strands are laid at an angle of about 45°. There is a further layer of reinforcing strands extending parallel to the axis of the tubular member.

The term "equipment" as used herein is intended to encompass any form of mechanical or electrical equipment desired to be supported at a height above the ground, including flags, static signs, manually movable signs such as a manual Stop/Go board for controlling traffic flow at road works, sports equipment such as a netball goal or basketball net, and electrically operable equipment of diverse kinds, including, in particular, temporary floodlights flags, electrically operable signs, traffic signals, public address loudspeakers, illuminated road signs, beacons, security, safety or speed cameras, satellite dishes, and television cameras.

BRIEF DESCRIPTION OF THE DRAWINGS

Embodiments of equipment adapted for temporary support above the ground are hereinafter more particularly described by way of example only with reference to the accompanying drawings, in which:

FIGS. 12 to 15 show different forms of equipment mounted to the first end of a tube in a structure as shown in FIG. 9;

DESCRIPTION OF PREFERRED EMBODIMENTS

Figure 1:
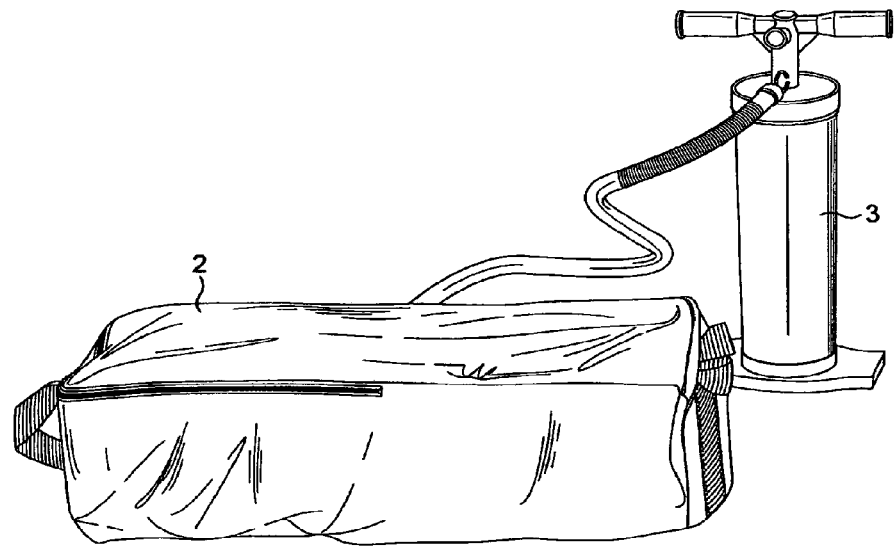
FIG. 1 shows a bag for transporting equipment and mast, and also a hand operable pneumatic pump.

As will be apparent from FIGS. 1 and 2, electrical equipment, here a temporary floodlight 1, and a mast for supporting the floodlight, as described in more detail hereinbelow, are readily transportable by a single person in a shoulder bag 2, and need only a simple manually operable pump, here a stirrup pump 3, for erection of the mast on site for temporary support of the electrical equipment above the ground.

Figure 2:
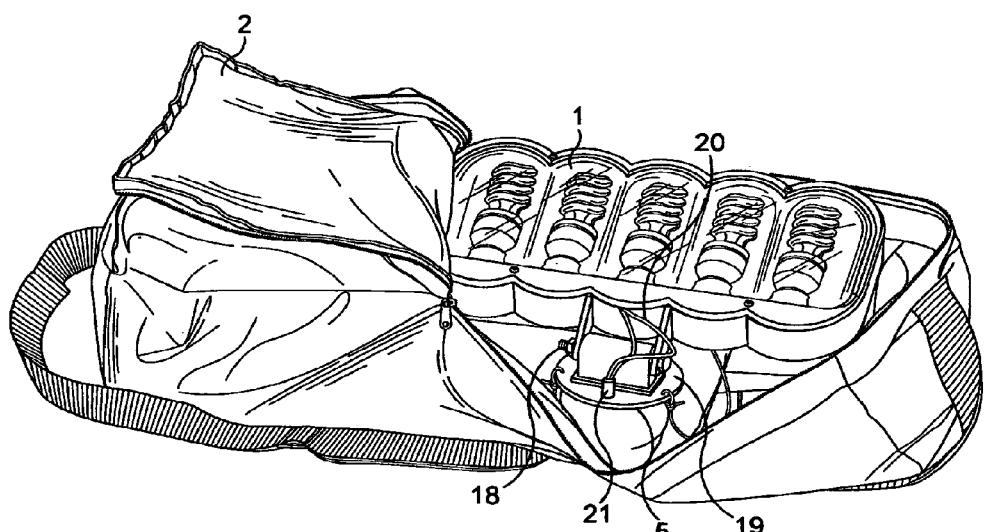
FIG. 2 shows the bag of FIG. 1 opened to reveal the equipment, here a temporary floodlight.
Figure 5:
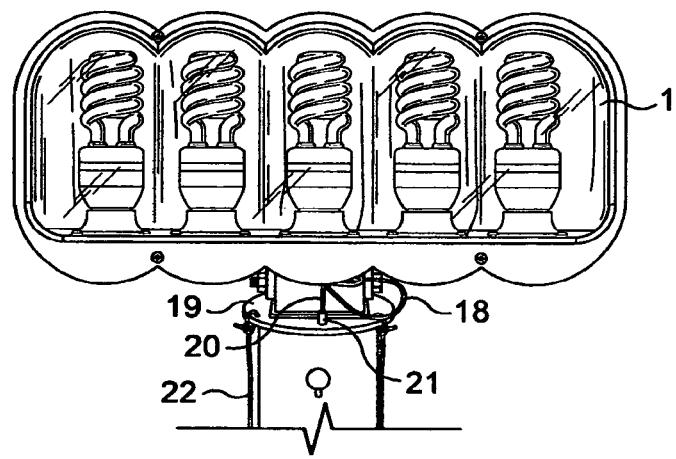
FIG. 5 shows the equipment and one end of the tube on an enlarged scale.

A pneumatically inflatable elongate tube 4, shown before inflation in FIG. 3, has a first end 5 coupled to the floodlight, as best shown in FIGS. 2 and 5, and a second end 6 coupled to a tripod 7, which is shown with its legs 8 unfolded in FIG. 3, but before extending the legs. In this arrangement the legs are telescopic, comprising a first leg member 9, the proximal end of which is pivoted at 10 to a tripod centre member 11 which is coupled to the second end 6 of the tube, and a second leg member 12 which is telescopically slidable within the first leg member 9 and clampable thereto when extended. The distal ends 13 of the first leg members are connected by struts 14 pivoted to ends 13 and also to a central member 15. The interlinked struts can be pushed beyond dead centre to brace the tripod against unintentional collapse.

A valve 16 is provided for coupling to a pneumatic line 17 connected to pump 3. An electrically operable pump, for example run from a cigar lighter socket in a car (automobile) may be used in place of a manually operable pump. Valve 16 is preferably placed near to the first end of tube 4 so that the mast may only be inflated or deflated when lying on the ground. This avoids the possible problem of electrical equipment falling on someone as the mast is deflated.

Figure 3:
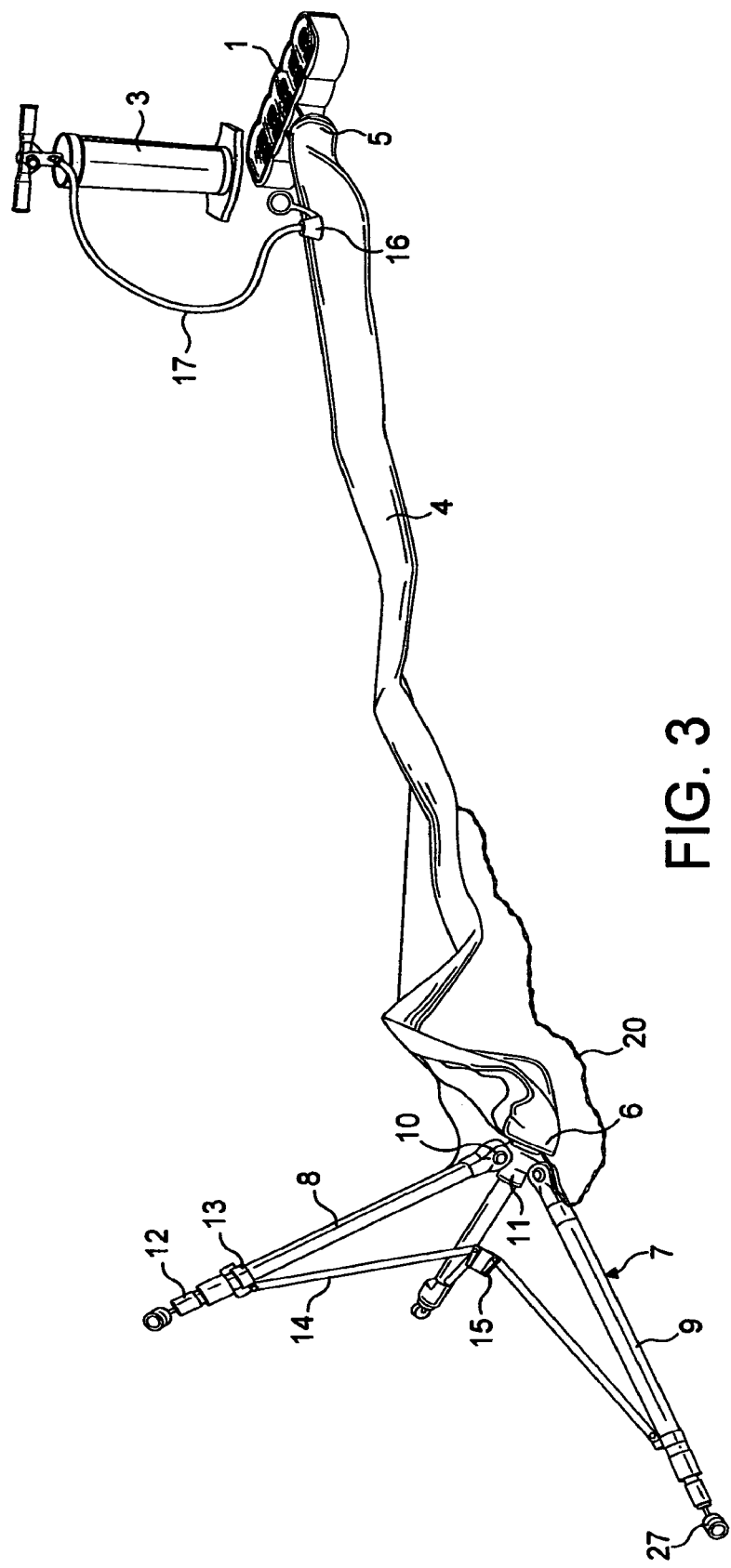
FIG. 3 shows the equipment and mast removed from the bag and coupled to the pump for inflation of an elongate tube.

As can be seen from FIGS. 2 and 5, floodlight assembly 1 is mounted on a bracket 18 so as to be angularly adjustable, bracket 18 being mounted on a disc 19 closing the first end 5 of the tube. Electrical wiring 20 for the floodlight assembly 1 passes through an air-tight grommet 21 into the interior of tube 4 and exits at the second end 6 of the tube 4, as best shown in FIG. 3, through a similar grommet (not shown).

Figure 4:
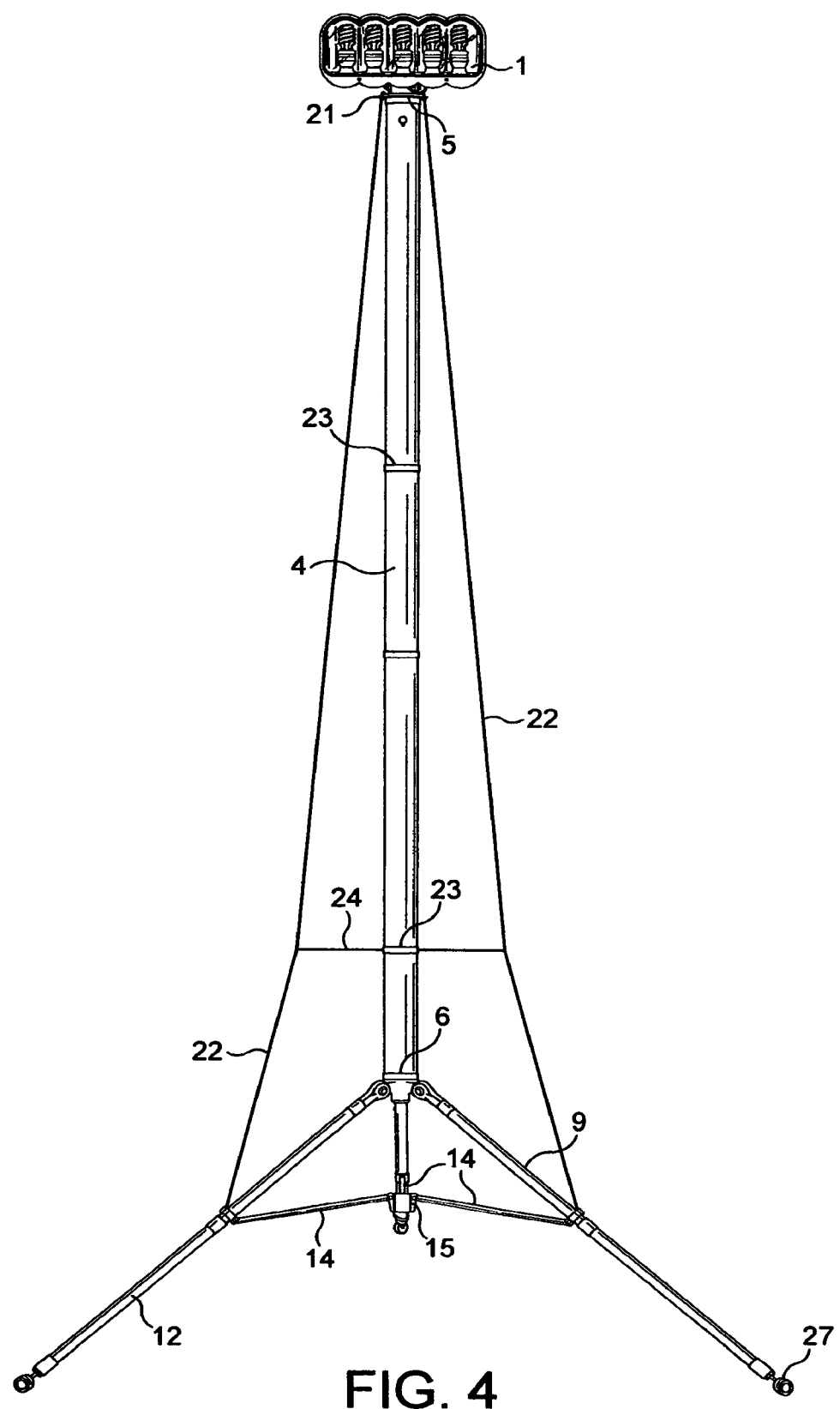
FIG. 4 shows the equipment supported by the erected mast.

Elongate flexible members, here in the form of guide lines 22 interconnect the distal ends of the first leg members with disc 19 at the first end 5 of the tube. When the tube 4 is adequately inflated (FIG. 4), the guide lines 22 are placed under tension. Guide lines 22 may be formed from single or multiple ply cords. Additional bracing cooperating with the guide lines 22 may be provided as shown in FIG. 4. Tube 4 is shown mounting several collars 23 along its length. Here illustrated only for one such collar, elastic cords 24 are coupled between the guide lines 22 and the collar 23. It will be understood that similar elastic cords may be provided for the other collars 23.

Figure 6:
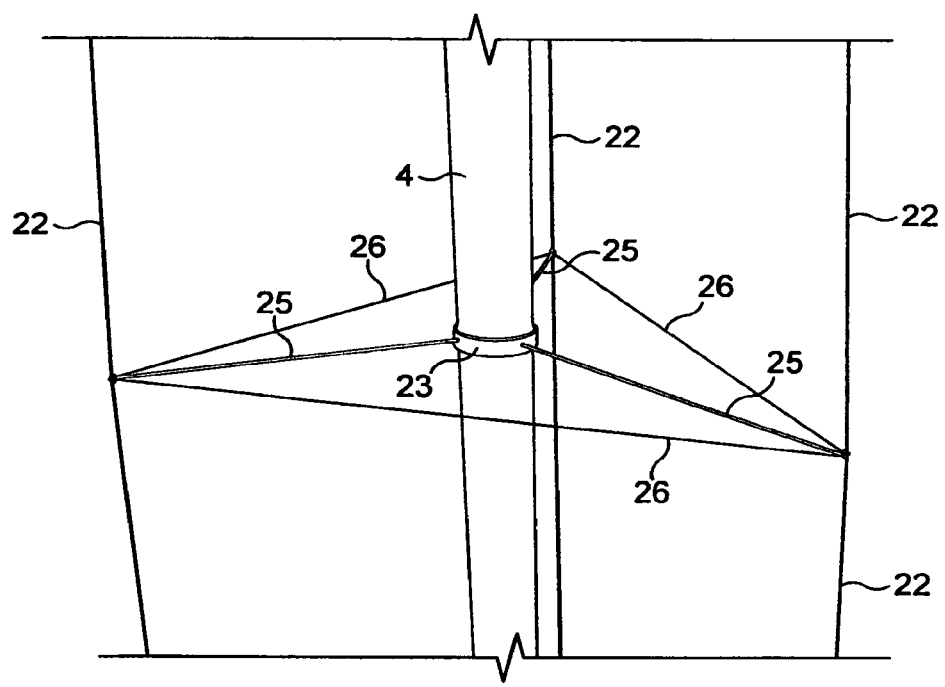
FIG. 6 shows an alternative intermediate bracing structure coupled to a collar on the tube.

An alternative intermediate bracing structure cooperating with guide lines 22 is shown in FIG. 6. In this embodiment, a collar 23 mounts three spokes 25, the distal end of each spoke being coupled to a respective guide line 22. The spoke distal ends are also preferably interconnected by cords 26.

Figure 7:
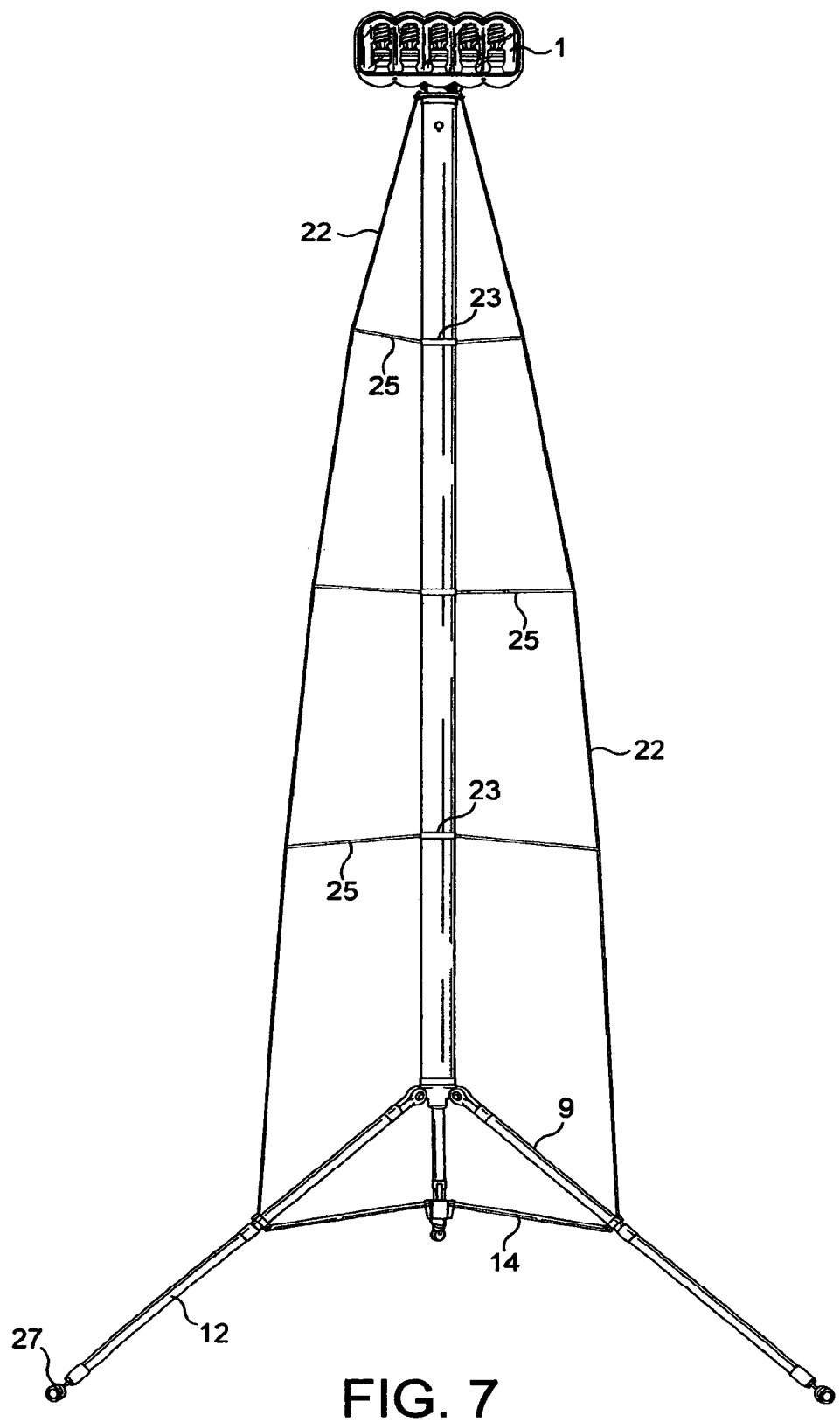
FIG. 7 is a view similar to FIG. 4 with a bracing structure including a variation of the intermediate structures shown in FIG. 6.
Figure 8:
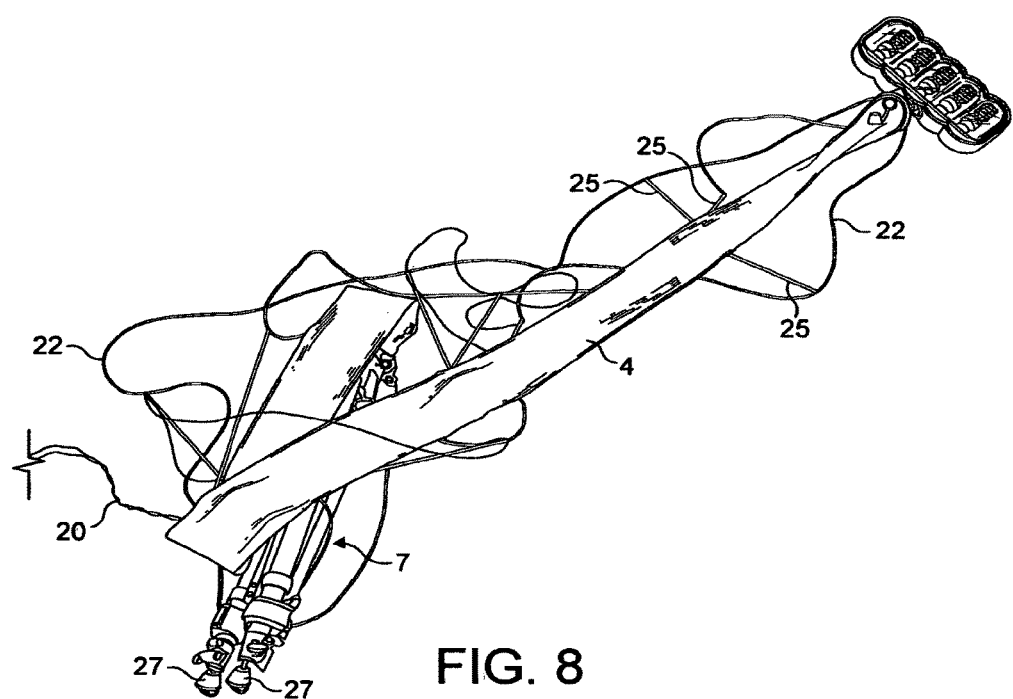
FIG. 8 shows the equipment and mast of FIG. 7 collapsed ready for packing away in a bag.

FIG. 7 shows an alternative embodiment of electrical equipment and supporting mast, employing additional bracing structures with spokes 25 as in FIG. 6, but without the additional cords 26. As can be seen from FIG. 8, even structure such as that of FIG. 7 will readily collapse for packing away for transport.

Tripod 7 may be provided with castors 27 so that the erected mast and equipment may be wheeled into position. The castors are preferably lockable.

Since the electrical equipment and mast may be packed away in a shoulder bag for ready transport, and may be erected on site simply by opening the tripod and inflating the tube, transport, erection and taking down can all be performed by a single person without any tools other than a simple pneumatic pump, and without any assembly or disassembly of mechanical parts.

Figure 9:
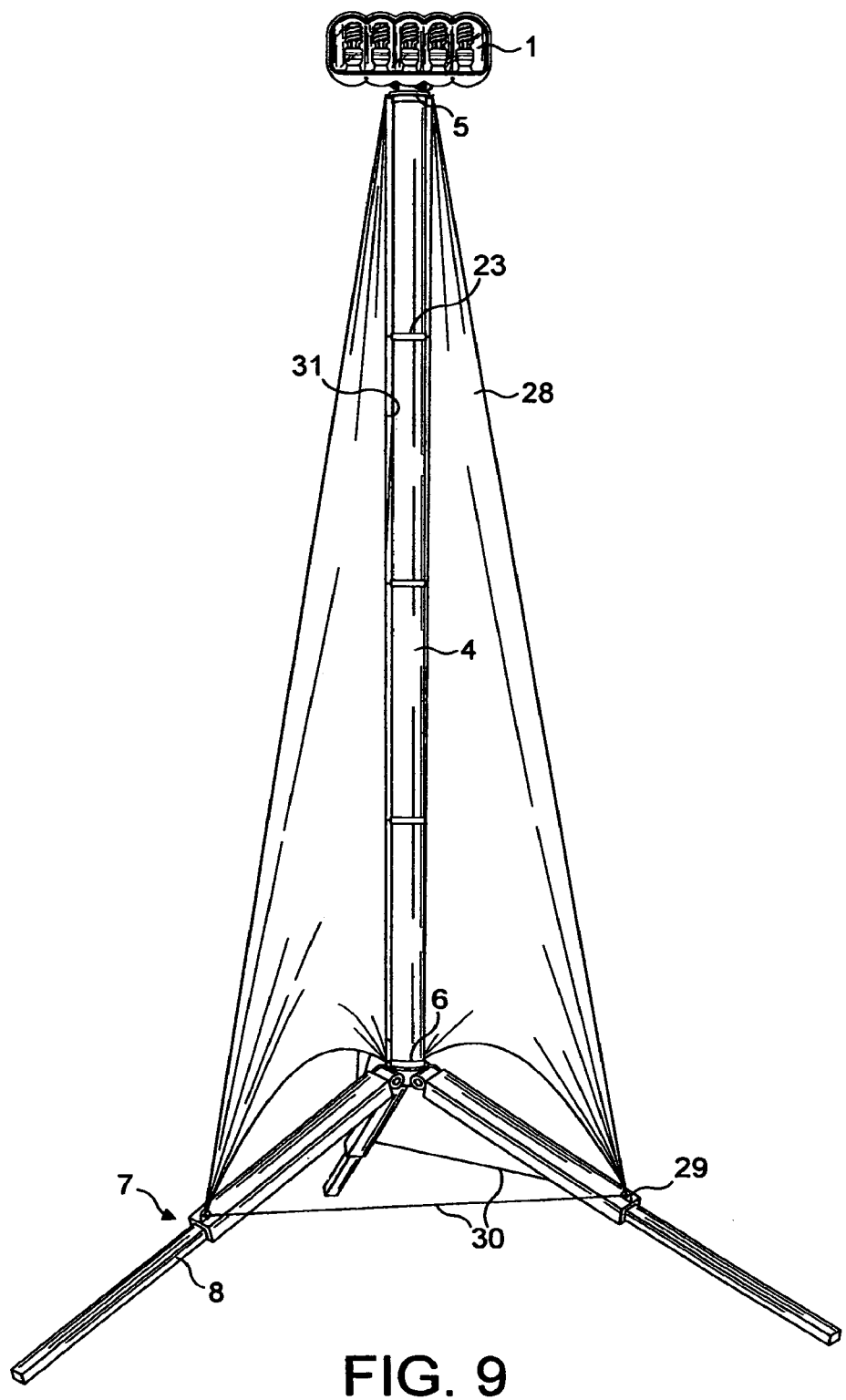
FIG. 9 is a view similar to FIG. 4 with an alternative web-based bracing structure.
Figure 10:
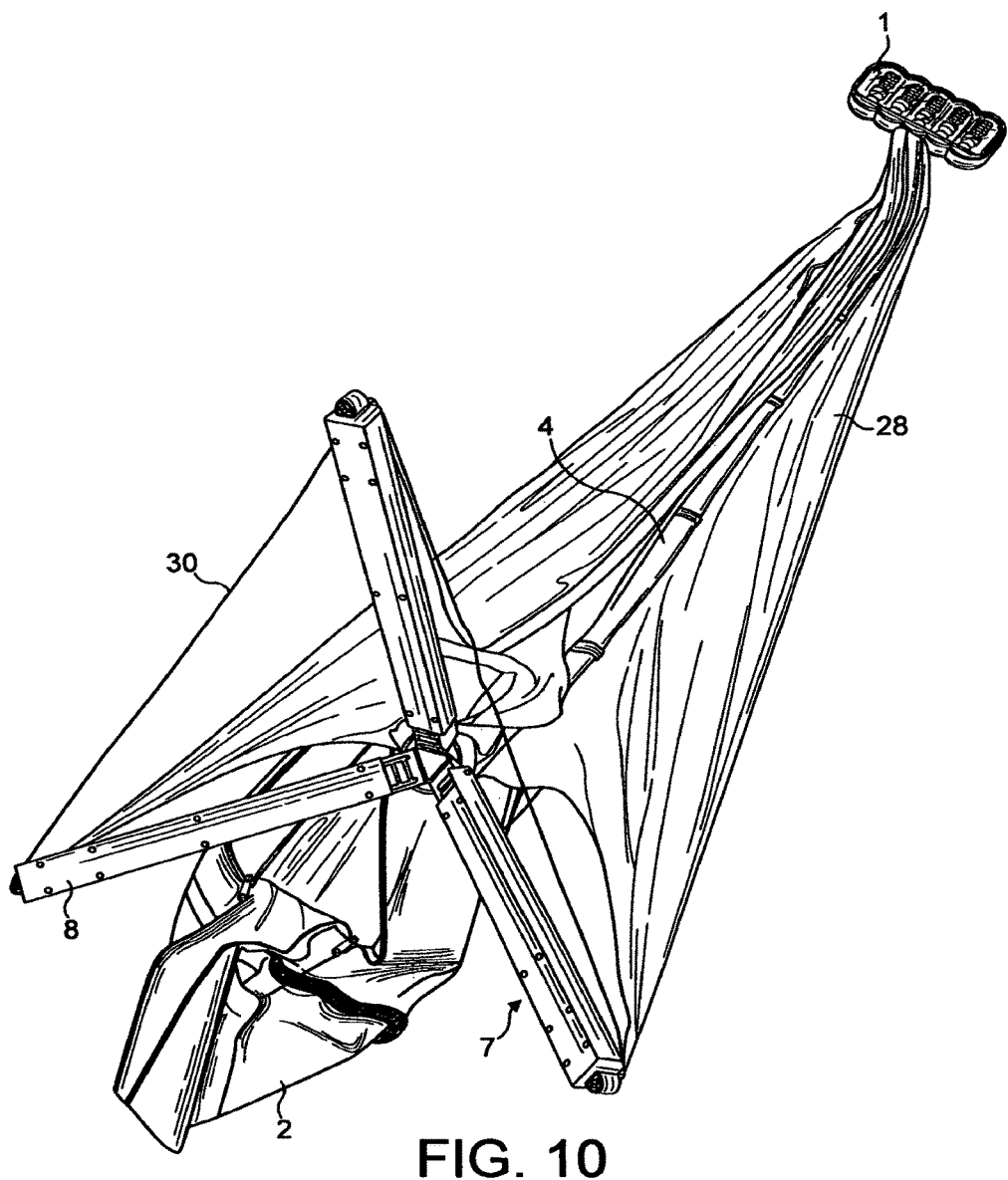
FIG. 10 shows the structure of FIG. 9 partially collapsed for packing away into its bag.
Figure 11:
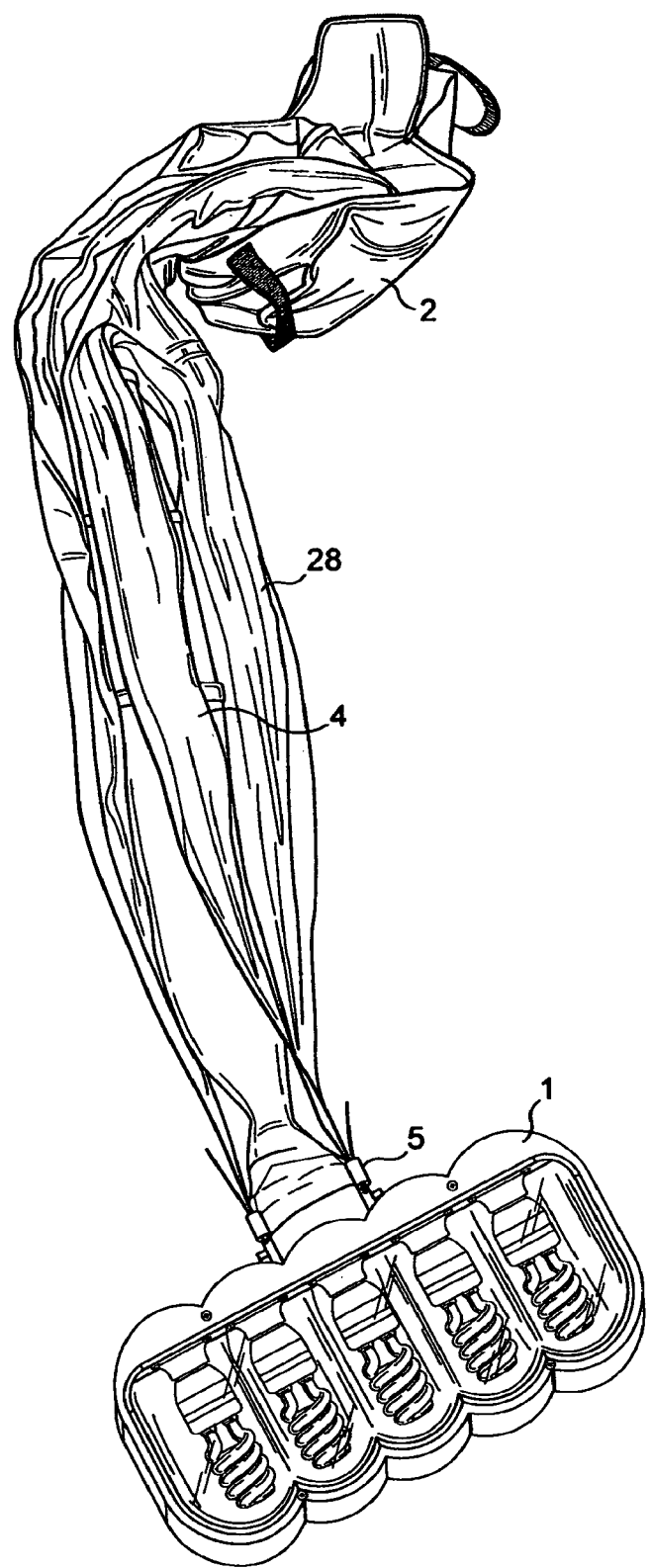
FIG. 11 shows the structure of FIG. 9 in the course of being so packed away.

Other arrangements are feasible. Thus, as illustrated in FIGS. 9 to 11, it is not necessary for the tube bracing structure to be provided by guide lines. Here respective flexible webs 28 interconnect mounting points 29 on the legs 8 with both the first 5 and second 6 ends of the tube. When the tube is inflated and erect on the tripod 7, the respective webs 28 are in tension between their mounting point 29 and the first end and between the first and second ends. Flexible cords 30 are here shown interconnecting the mounting points 29. We have found that the illustrated structure remains stable even in a moderate wind. To reduce any tendency for the webs 28 to act as sails, they may include apertures (not shown) to allow air to pass through the webs. The webs may be connected along their inner edges 31 adjacent the tube 4 to collars 23 spaced along the tube.

Figure 12:
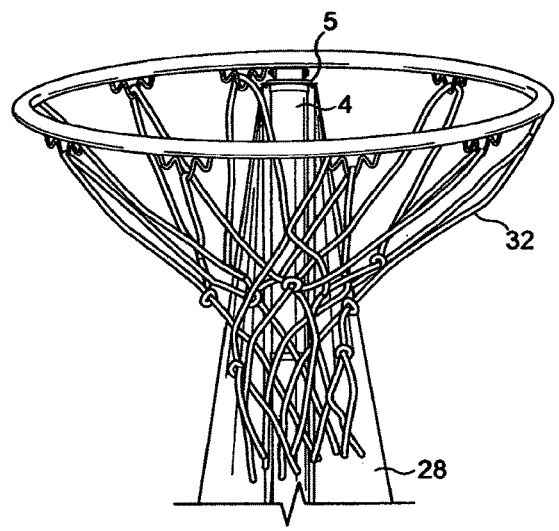
Figure 13:
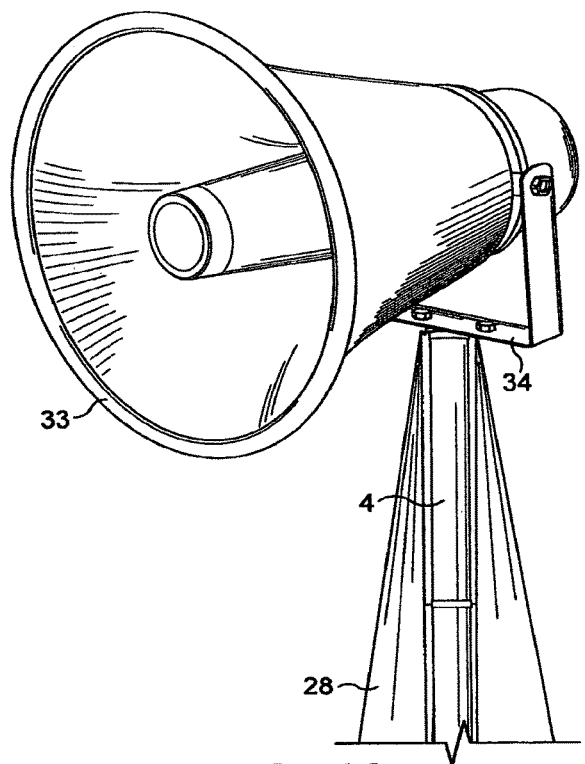

While the embodiments illustrated in FIGS. 1 to 11 include electrical equipment in the form of a floodlight, persons of ordinary skill will readily appreciate that similar masts may be employed to mount other forms of equipment that it is desired to temporarily support above the ground, such as, without limitation, public address speakers, temporary traffic signals or illuminated road signs, security, safety or speed cameras, or communication equipment such as satellite dishes, or even equipment that is not electrical, such as, without limitation, basketball or netball nets, or signs that do not require illumination. FIG. 12 shows a netball goal 32 mounted to a first end of a tube in a structure otherwise as shown in FIG. 9. FIG. 13 shows a public address loudspeaker 33 mounted by a swivel bracket 34 to a first end of a tube in a structure otherwise as shown in FIG. 9. FIG. 14 shows a close circuit television camera 35, for example a security camera or a speed camera, coupled by an adjustable mount 36 to a first end of a tube in a structure otherwise as shown in FIG. 9. FIG. 15 shows a static warning sign 37 mounted to a first end of a tube in a structure otherwise as shown in FIG. 9.

The elongate tube 4 may be formed from a similar material to that described in our co-pending British Patent Application No: 0501474.1 (published as GB 2422322 A) for use in providing inflatable sports goals. The material suggested in GB 2422322 for forming the tubular struts was natural or synthetic rubber, or plastics substitutes, preferably reinforced with nylon thread. Commercial embodiments of sports goals have since been produced and sold under our Registered Community Trademark Igoal®, and are formed with a thickness in the material of the struts of around 2 mm, and a diameter for the goalposts and cross-bar of 3 inches (7.62 cm), and work well when inflated with an applied pressure of around 1 Bar. The tubular members employ inner and outer layers of soft polyvinylchloride (PVC) with nylon threads between the two layers helically wound in opposing senses about the axis of the tube so as to cross, being laid typically with an angle to the axis of 80° or more. The two plastics layers are softened to fuse together in the interstices between the nylon threads. We have found that this structure prevents the tube from ballooning (expanding diametrically) in use. An additional layer of parallel threads preferably runs along the length of the tubular member to prevent stretching lengthwise in use.

Elongate tubes formed in the same way work well with the structures described in the present Specification. However, as explained below, and as described and illustrated in our co-pending Patent Application No: 0819761.8 (not yet published at the date of filing of the present application), we have found that improved results can be achieved with alternative tubular structures.

Figure 16:
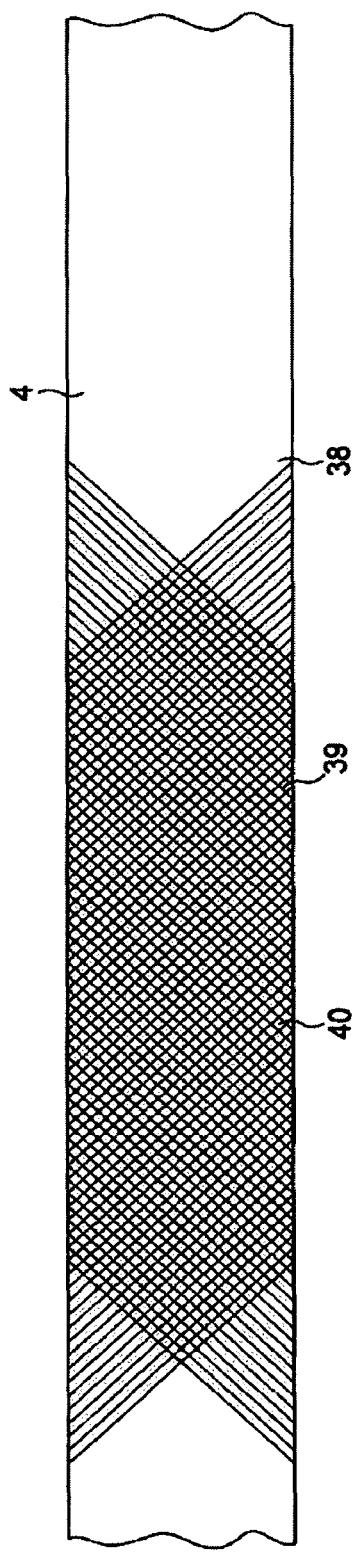
FIG. 16 shows a somewhat schematic and incomplete side elevational view of a tube with reinforcing strands wound at 45°.

In FIG. 16, tube 4 comprises a layer 38 of plastics, suitably a relatively soft plastics material such as PVC, or rubber, overlaid with reinforcing strands 39. The strands 39 comprise a textile material, preferably nylon. In FIG. 16, the strands 39 are wound helically about layer 38 in opposing senses at an angle of 45° to the axis of the tubular member. The opposing sense strands may be interwoven, forming a woven textile reinforcing structure 40.

Figure 17:
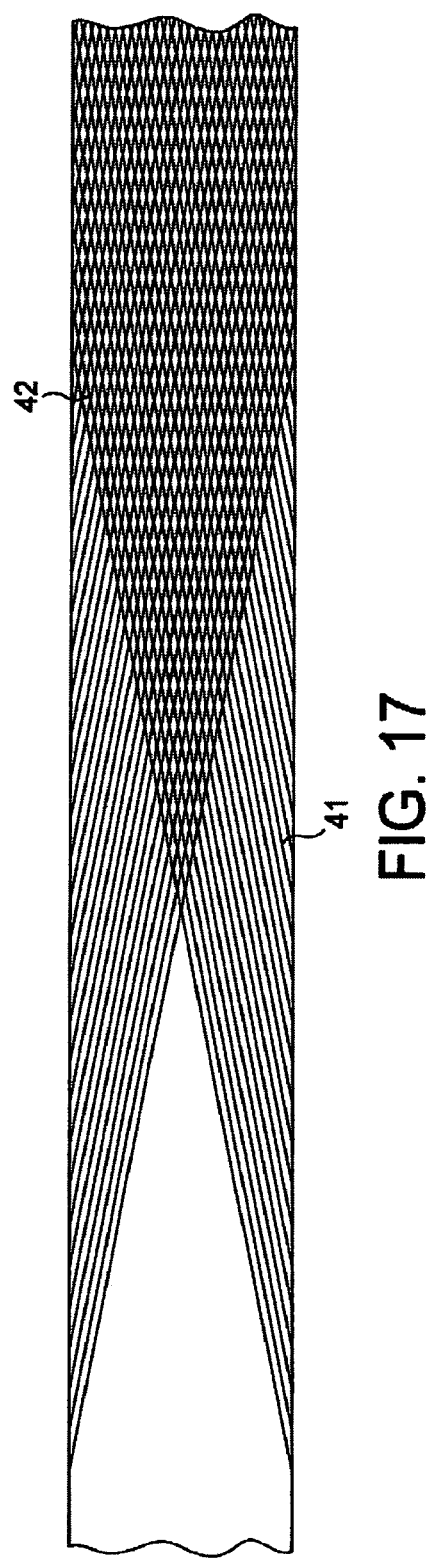
FIG. 17 shows a similar side elevational view of a tube with reinforcing strands wound at 10°.

In FIG. 17, similar reinforcing strands 41 are laid at an angle of 10°, again in opposing senses, the opposing sense strands being interwoven, thereby resulting in a woven textile reinforcing structure 42. Our experiments have shown that a tube 4 as illustrated in FIG. 17 would be substantially more rigid when inflated to the same operating pressure than a structure as shown in FIG. 16, which is already an improvement on the structure described in GB 2422322 and that a significantly improved rigidity can already be detected at an angle reduced from the 45° angle of FIG. 17 to about 30°.

Figure 18:
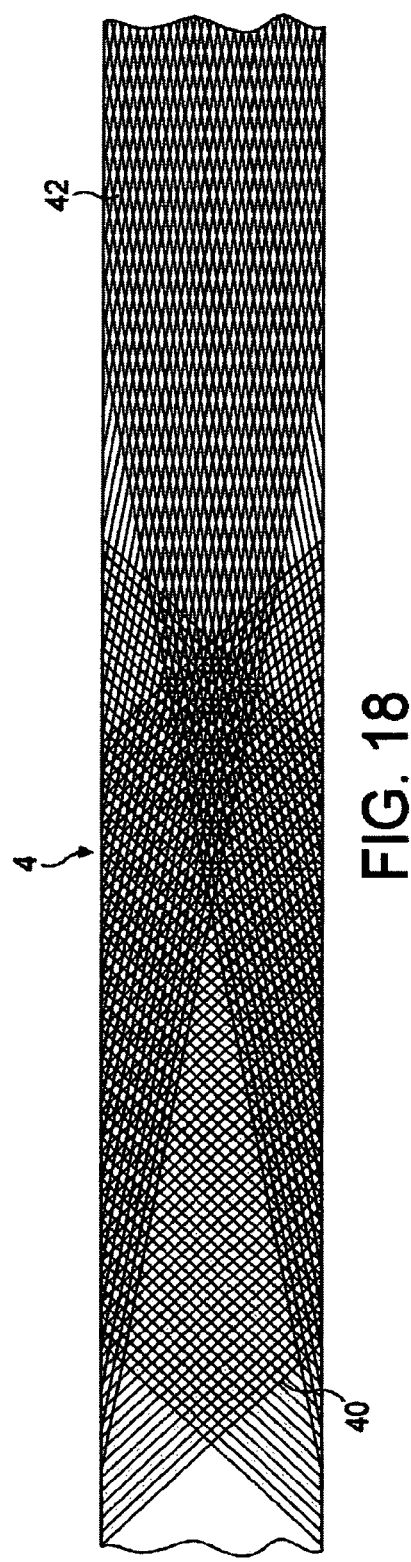
FIG. 18 shows a similar side elevational view of a tube with reinforcing strands wound as in both FIG. 16 and FIG. 17.
Figure 19:
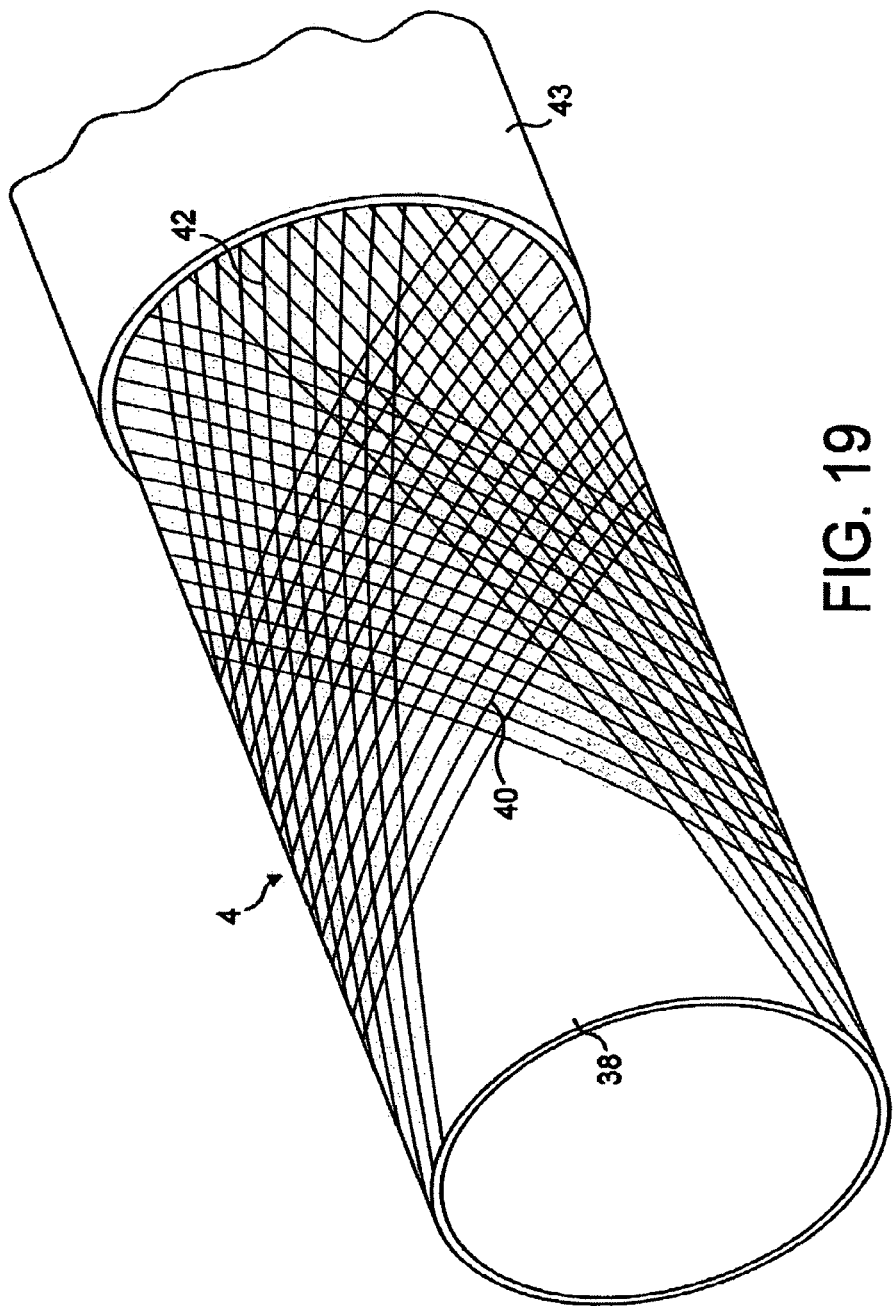
FIG. 19 is perspective view of a length of the tube of FIG. 18 with the strands shown between two plastics layers, one shown partly cut away to show the strands.

FIGS. 18 and 19 show a preferred structure with two superposed reinforcing layers comprising the woven textile reinforcing structures 40 and 42.

It will be understood that in each of FIGS. 16 to 19, the reinforcing structures are shown incomplete for the purpose of illustration and explanation, and that in practice the reinforcing structures would extend along the entire length of the tube 4.

As best shown in FIG. 19, a second layer 43 of plastics, suitably a relatively soft plastics material such as PVC, or rubber overlies the reinforcing structures. As can be seen from the drawings, the textile strands are spaced so that, even with two superposed reinforcing structures, as in FIGS. 18 and 19, there are interstices between the strands. During application of the second layer 43, or subsequently thereto, the two layers 38 and 42 are warmed sufficiently to fuse together through the interstices of the reinforcing layers.

Figure 20:
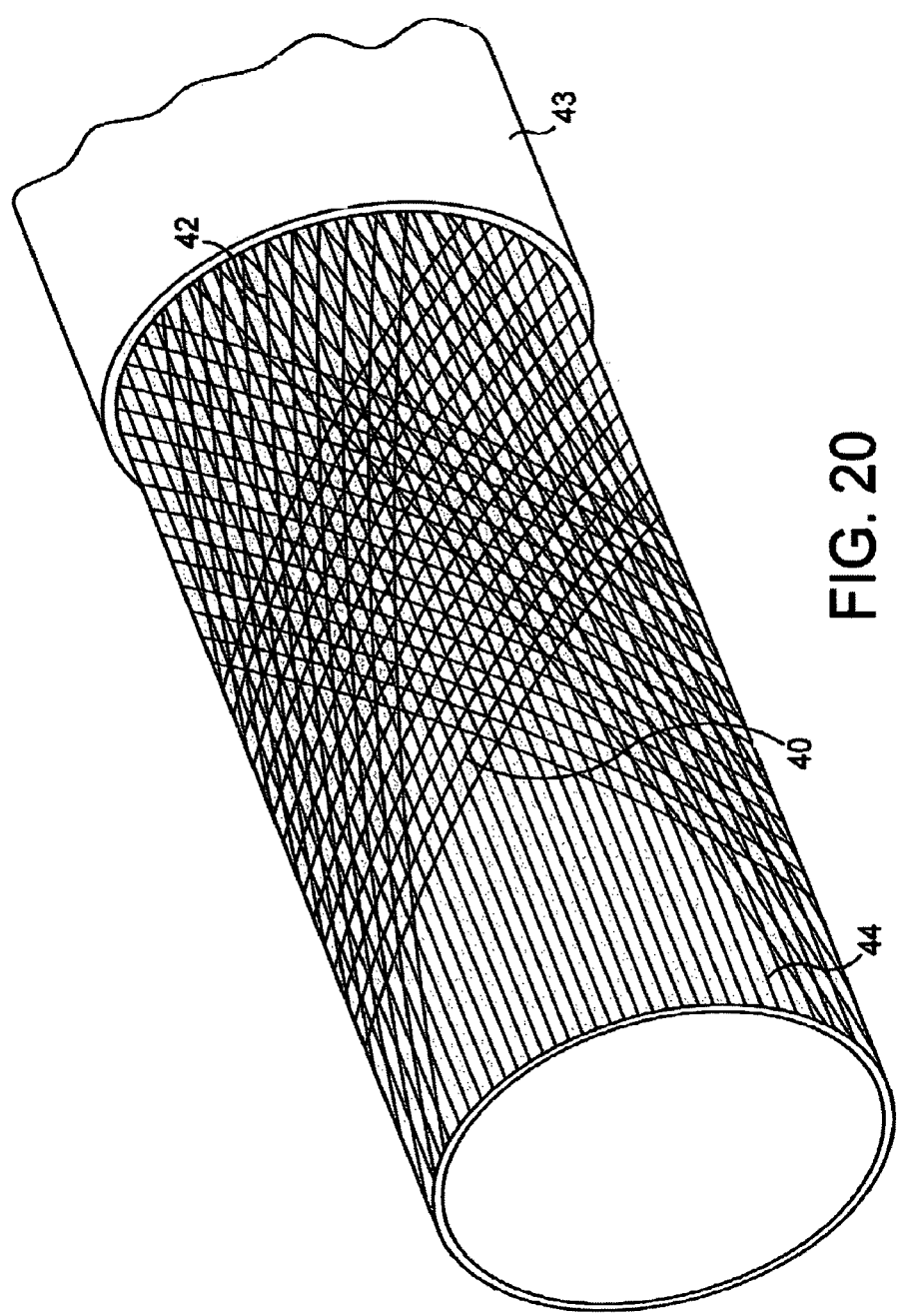
FIG. 20 is a perspective view similar to FIG. 19 for a tube with a further layer of reinforcing strands parallel to the axis of the tube.

FIG. 20 shows a variation on the structure of FIGS. 18 and 19, in which a further layer of reinforcing strands 44 is employed, the strands, in this case, extending parallel to the axis of the tubular member. These strands help to prevent the tube 4 stretching lengthwise.

For most purposes contemplated by the present invention, we find that a tube 4, as shown in FIGS. 18 and 19 or in FIG. 20, having a diameter of 3 inches (7.62 cm) when inflated to a typical inflation pressure of around 1 Bar, namely between 10 and 20 psi (6.89 to 13.79*10$^4$ pascals), realisable with a foot pump or with an inexpensive tyre pressure pump operating from the cigar lighter socket of a vehicle, and an overall thickness of 2 mm, works well. The textile strands are preferably in the form of thin textile thread. The textile thread may comprise conventional nylon sewing thread. It will be understood, however, that different diameters and thicknesses may be chosen. The tube 4 when deflated is readily flexible, allowing the temporary structure to be packed away and to be portable.

The adoption of tubes 4, especially as shown in FIGS. 18 and 19, which possess enhanced rigidity when inflated, raises the prospect of providing masts for equipment to be mounted aloft as described above, where the mast is significantly taller than heretofore, or where the bracing structure is reduced.

The invention claimed is:

1. A support member comprising:
   an elongate pneumatically inflatable tubular chamber defined by a flexible wall material extending along a longitudinal axis between an upper end and a lower end, the upper end, lower end, and flexible wall material defining a closed tubular chamber, wherein the tubular chamber is collapsed when deflated and is substantially inflexible when inflated;
   wherein the flexible wall material includes a material selected from rubber and plastics, and has internal reinforcing strands in a helical orientation that extends along the longitudinal axis within the flexible wall material, the reinforcing strands defining openings between the strands;
   wherein the strands are encapsulated in the flexible material;
   wherein the flexible wall material extends through the openings between the strands;
   a base at the lower end of the inflatable tubular chamber, the base configured to orient the support member vertically to the ground when the tubular chamber is inflated; and
   an object supported at the upper end of the inflatable tubular chamber.

2. The support member of claim 1, wherein the reinforcing strands include reinforcing strands oriented helically in opposing senses about the longitudinal axis of the tubular chamber so as to cross.

3. The support member of claim 1, wherein the reinforcing strands include reinforcing strands oriented helically along the longitudinal axis of the tubular chamber, the reinforcing strands including a first portion of the reinforcing strands at a first angle to the longitudinal axis, and a separate second portion of the reinforcing strands at a second angle to the longitudinal axis.

4. The support member of claim 1, wherein the reinforcing strands are at an angle of 45 degrees or less to the longitudinal axis.

5. The support member of claim 3, wherein the first portion of the reinforcing strands are at an angle of between 10 degrees and 15 degrees to the longitudinal axis and the separate second portion of the reinforcing strands are at an angle of about 45 degrees to the longitudinal axis.

6. The support member of claim 3, wherein the reinforcing strands include further reinforcing strands extending parallel to the longitudinal axis of the tubular chamber.

7. The support member of claim 3, wherein the first and second portions of the reinforcing strands define a woven textile reinforcing structure with the first and second portions in opposing senses within the flexible wall material.

8. The support member of claim 1, wherein the object is a light assembly.

9. The support member of claim 1, wherein the material is PVC plastic and the reinforcing strands include nylon.

10. A support member comprising:
a flexible wall extending along a longitudinal axis, the flexible wall enclosing and defining a pneumatically inflatable chamber, wherein the flexible wall defines an inner surface inside the inflatable chamber, and an outer surface outside the inflatable chamber; and
an inflation valve in fluid communication with the inflatable chamber and configured to pneumatically inflate the support member;
wherein the flexible wall includes a wall material selected from rubber and plastics;
wherein the wall material includes internal textile reinforcing strands in a helical orientation between the inner and outer surfaces, the wall material enveloping the internal reinforcing strands; and
wherein the support member is collapsed when deflated and is substantially inflexible supporting an object above the ground when inflated.

11. The support member of claim 10, wherein the reinforcing strands include nylon reinforcing strands in opposing senses about the longitudinal axis of the support member so as to cross.

12. The support member of claim 11, wherein a first portion of the reinforcing strands are at a first angle to the longitudinal axis, and a separate second portion of the reinforcing strands are at a second angle to the longitudinal axis.

13. The support member of claim 12, wherein the first angle is 45 degrees or less, and the second angle is 30 degrees or less.

14. The support member of claim 12, wherein the first angle is between 10 degrees and 15 degrees and the second angle is about 45 degrees.

15. The support member according to claim 10, wherein the inflatable chamber is substantially inflexible when the inflatable chamber is inflated to a pressure of between 10 and 20 psi (6.89 to 13.79*$10^4$ pascals).

16. The support member of claim 1, wherein the object supported above the ground is a light assembly.

17. A support member comprising:
a first end, a second end, and a flexible wall extending along a longitudinal axis between the first and second ends, wherein the first end, second end, and flexible wall define a pneumatically inflatable chamber, the flexible wall having an inner surface inside the inflatable chamber, and an outer surface outside the inflatable chamber, wherein the flexible wall includes wall material of polyvinylchloride;
a textile reinforcing structure including helically oriented textile strands arranged in opposing senses, wherein the textile reinforcing structure is inside the wall material between the inner and outer surfaces, the textile reinforcing structure defining multiple interstices between the textile strands, and wherein the wall material extends through the interstices of the reinforcing structure; and
an inflation valve positioned at or near the second end of the support member, the inflation valve in fluid communication with the inflatable chamber and configured to pneumatically inflate the support member;
wherein the inflatable chamber is collapsed when deflated and is substantially inflexible supporting an object at the first end above the ground when inflated.

18. The support member of claim 17, wherein the helically oriented textile strands include a first portion of the strands at a first angle to the longitudinal axis, and a separate second portion of the strands at a second angle to the longitudinal axis.

19. The support member of claim 17, wherein the textile strands are at an angle of 45 degrees or less to the longitudinal axis.

20. The support member of claim 17, wherein the textile strands in the textile reinforcing structure include reinforcing strands extending parallel to the longitudinal axis of the support member.

\* \* \* \* \*